(12) United States Patent
Svensson et al.

(10) Patent No.: US 9,539,994 B2
(45) Date of Patent: Jan. 10, 2017

(54) METHOD FOR OPERATING AN ELECTROMECHANICAL VEHICLE BRAKING

(71) Applicant: FORD GLOBAL TECHNOLOGIES, LLC, Dearborn, MI (US)

(72) Inventors: Thomas Svensson, Leichlingen (DE); Tim Jurkiw, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/738,692

(22) Filed: Jun. 12, 2015

(65) Prior Publication Data

US 2015/0360665 A1 Dec. 17, 2015

(30) Foreign Application Priority Data

Jun. 13, 2014 (DE) .................. 10 2014 211 380

(51) Int. Cl.
*B60T 13/74* (2006.01)
*B60T 8/32* (2006.01)
(Continued)

(52) U.S. Cl.
CPC ............... *B60T 13/745* (2013.01); *B60T 7/22* (2013.01); *B60T 8/171* (2013.01); *B60T 8/3255* (2013.01);
(Continued)

(58) Field of Classification Search
CPC ........ B60T 13/745; B60T 7/22; B60T 8/3275; B60T 8/171; B60T 8/3255; B60T 2201/03; B60T 8/4872
See application file for complete search history.

(56) References Cited

U.S. PATENT DOCUMENTS 5,614,788 A * 3/1997 Mullins .................. B60Q 1/143
307/10.8
6,059,380 A 5/2000 Pueschel et al.
(Continued)

FOREIGN PATENT DOCUMENTS

DE 196 15 449 B4 10/1997
DE 10 2007 049 516 A1 4/2008
(Continued)

OTHER PUBLICATIONS

Examination Report dated Jan. 28, 2015 issued in related German Application No. 10 2014 211 377.6.
(Continued)

*Primary Examiner* — Rodney Butler
*Assistant Examiner* — Frederick Brushaber
(74) *Attorney, Agent, or Firm* — Jones Robb, PLLC; Raymond L. Coppiellie

(57) ABSTRACT

A method for operating an electromechanical vehicle brake system is provided. The method comprises determining that an activation condition has been met, building an initial portion of the pre-charge pressure in the brake system, applying the initial portion of the pre-charge pressure to at least one wheel brake, building a secondary portion of the pre-charge pressure in the brake system, and adjusting the secondary portion of the pre-charge pressure to an expected braking pressure. Adjusting the secondary portion of the pre-charge pressure may include reducing the secondary portion of the pre-charge pressure.

18 Claims, 2 Drawing Sheets

(51) Int. Cl.
*B60T 7/22* (2006.01)
*B60T 8/48* (2006.01)
*B60T 8/171* (2006.01)

(52) U.S. Cl.
CPC ............ *B60T 8/3275* (2013.01); *B60T 8/4872* (2013.01); *B60T 2201/03* (2013.01)

(56) References Cited

U.S. PATENT DOCUMENTS

| | | | | |
|---|---|---|---|---|
| 6,082,830 | A * | 7/2000 | Volz | B60T 8/3655 303/113.2 |
| 6,203,116 | B1 * | 3/2001 | Dieckmann | B60T 8/885 303/122 |
| 6,499,812 | B1 * | 12/2002 | Gronau | B60T 8/405 303/10 |
| 7,866,761 | B2 * | 1/2011 | Gerum | B60T 13/66 303/122.15 |
| 8,271,172 | B2 * | 9/2012 | Heller | B60T 8/36 701/70 |
| 8,770,673 | B2 * | 7/2014 | Wuerth | B60T 1/10 303/3 |
| 2002/0153767 | A1 * | 10/2002 | Pasterkamp | B60T 8/409 303/114.1 |
| 2003/0234576 | A1 | 12/2003 | Reuter et al. | |
| 2008/0175736 | A1 | 7/2008 | Choi et al. | |
| 2009/0314256 | A1 | 12/2009 | Bland | |
| 2010/0010716 | A1 | 1/2010 | Sawada et al. | |
| 2010/0213757 | A1 | 8/2010 | Wagner et al. | |
| 2011/0248560 | A1 * | 10/2011 | Vollert | B60T 7/22 303/13 |
| 2012/0255817 | A1 * | 10/2012 | Vollert | B60T 8/405 188/71.8 |
| 2013/0338894 | A1 | 12/2013 | Olofsson | |
| 2014/0058641 | A1 | 2/2014 | Theel | |
| 2016/0031423 | A1 | 2/2016 | Ishida et al. | |

FOREIGN PATENT DOCUMENTS

| | | |
|---|---|---|
| DE | 10 2008 054 856 A1 | 7/2010 |
| DE | 10 2009 028 010 B3 | 1/2011 |
| DE | 10 2013 222 880 A1 | 5/2014 |
| EP | 2 409 885 A1 | 1/2012 |

OTHER PUBLICATIONS

Examination Report dated Feb. 18, 2015 issued in related German Application No. 10 2014 211 378.4.
Examination Report dated Mar. 12, 2015 issued in corresponding German Application No. 10 2014 211 380.6.
Non-Final Office Action dated Mar. 24, 2016 in U.S. Appl. No. 14/738,687.
Non-Final Office Action dated Apr. 13, 2016 in U.S. Appl. No. 14/738,676.
Notice of Allowance dated Sep. 15, 2016, in co-pending U.S. Appl. No. 14/738,676.
Notice of Allowance dated Aug. 31, 2016, in co-pending U.S. Appl. No. 14/738,687.

* cited by examiner

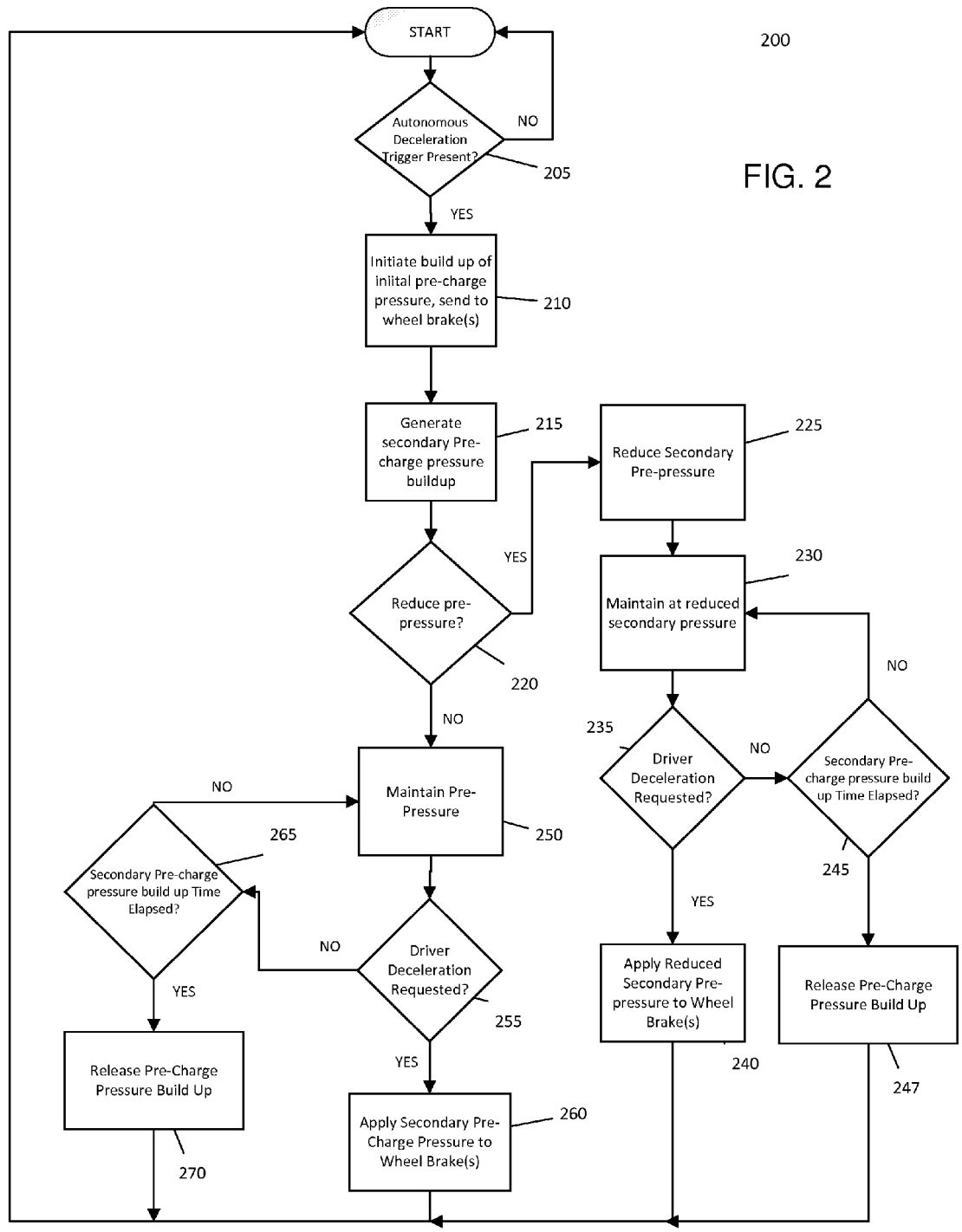

METHOD FOR OPERATING AN ELECTROMECHANICAL VEHICLE BRAKING

CROSS REFERENCE TO RELATED APPLICATIONS

This application claims priority to German Application No. 10 2014 211 380.6, filed on Jun. 13, 2014, the entire content of which is incorporated by reference herein.

This application is related to U.S. patent application Ser. No. 14/738,676, filed Jun. 12, 2015, which claims priority to German Application No. 10 2014 211 377.6, filed on Jun. 13, 2014. This application also is related to U.S. patent application Ser. No. 14/738,687, filed on Jun. 12, 2015, which claims priority to German Application No. 10 2014 211 378.4, filed on Jun. 13, 2014. The entirety of the contents of each of these related applications is incorporated herein by reference.

TECHNICAL FIELD

The present disclosure relates generally to a method for operating an electromechanical braking system, in particular a vehicle braking system.

BACKGROUND

Braking assistance systems fitted in vehicles support the driver of the vehicle on hazard or emergency braking. The principle is based on analysis of accident events. In this analysis it was found that the possible brake force amplification was actually only rarely used, since the foot brake was activated either too weakly or too late. The result is a disadvantageous elongation of the braking distance, which may for example lead to collision accidents.

Conventional brake force boosters operate with an evacuated volume. The difference between the vacuum (negative pressure) and the atmospheric pressure is used to generate an auxiliary force. This serves to increase the activation force applied by the driver, so that the actual braking force is composed of the activation force and the auxiliary force. In contrast, electromechanical braking systems work without vacuum. Here the braking pressure is produced by one or more electric motors. Hence there is no mechanical connection between the brake pedal and the wheel brake(s). The resistance felt for example at the brake pedal is produced independently in the form of feedback.

The combination of electronic and usually hydraulic components entails certain inertia in the response behavior of such electromechanical braking systems. In other words, these require a reaction time between the deceleration request and the actual occurrence of the initiated braking process. To counter this disadvantage, in a parallel German application, number 10 2014 211 377.6, the applicant has proposed a method for operating an electromechanical braking system for a vehicle. This significantly improves the performance of the braking system as a whole, both for a deceleration request initiated by the person operating the vehicle and for an automatic vehicle control system. The entire content of German application number 10 2014 211 377.6 is incorporated herein by reference.

The solution proposed provides that, in advance of a possible braking process, on the basis of a trigger factor, a temporary pre-pressure is created in at least one part of the vehicle braking system. In this way, when the expected braking process actually occurs, a pre-pressure created semi-preventatively is already present to an adequate level. During the actual braking process, the pre-pressure may be passed on, either in full or in part, to at least one wheel brake of the vehicle braking system. The pre-pressure may evidently also be supplemented by an additional pressure depending on the intensity of the braking process. As a result, the reaction time of the braking system is significantly reduced.

Despite the resulting advantages, electromechanical braking systems still offer room for improvement. Thus in connection with the creation of pre-pressure, the question arises of how this can be adapted ideally to the individual deceleration request.

SUMMARY

In accordance with various exemplary embodiments of the present disclosure, a method for operating an electromechanical vehicle brake system is provided. The method comprises determining that an activation condition has been met, building an initial portion of the pre-charge pressure in the brake system, applying the initial portion of the pre-charge pressure to at least one wheel brake, building a secondary portion of the pre-charge pressure in the brake system, and adjusting the secondary portion of the pre-charge pressure to an expected braking pressure.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein:

FIG. 2 is a flowchart illustrating a second exemplary embodiment of a method of operating a brake system in accordance with the present disclosure.

Figure 1:
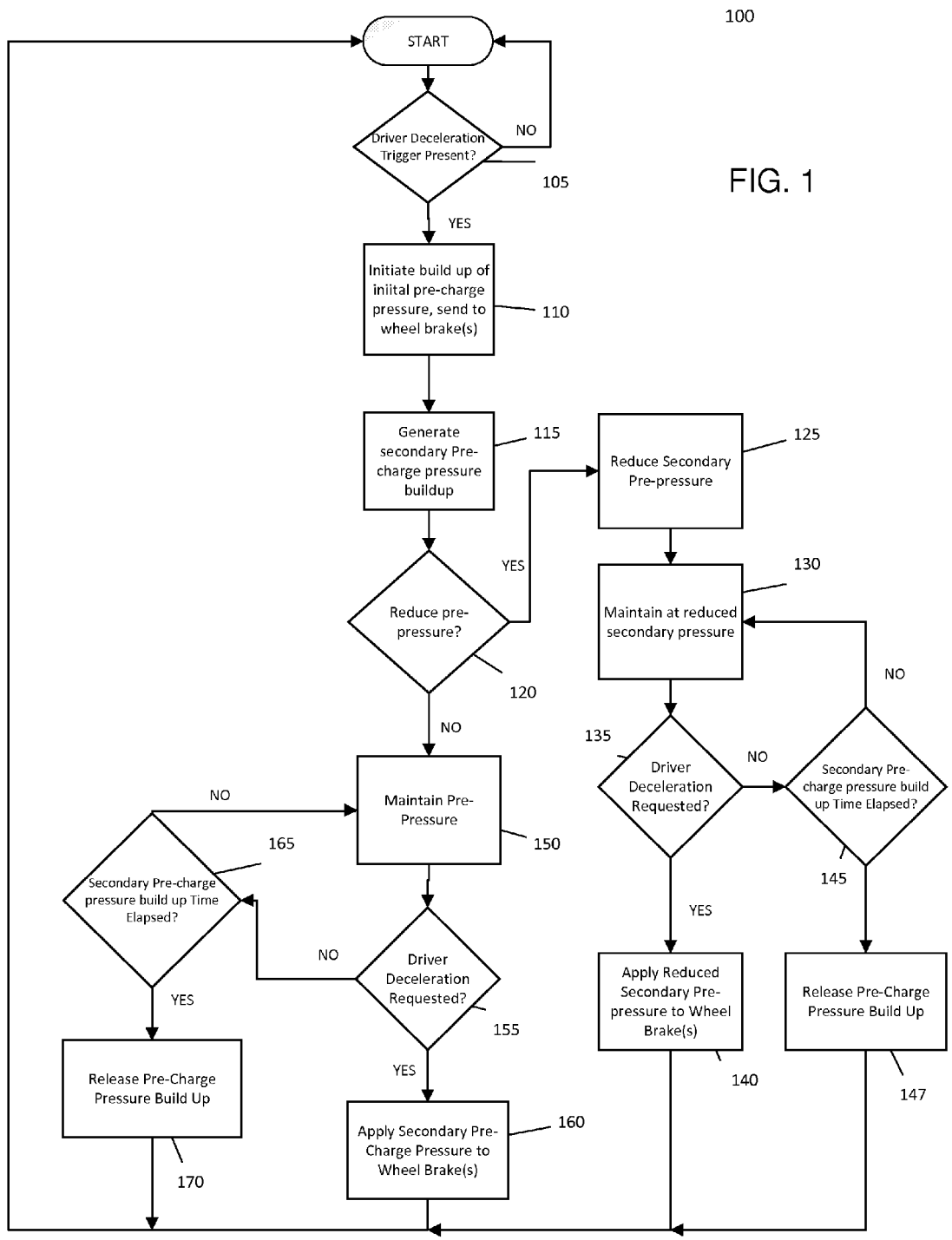
FIG. 1 is a flowchart illustrating a first exemplary embodiment of a method of operating a brake system in accordance with the present disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a method is described below for operating such an electromechanical vehicle braking system. The method according to the disclosure proposes that, in advance of a possible braking process, a temporary pre-pressure is created in at least one part of the vehicle braking system. The pre-pressure may mean a pressure build-up in at least one region of the hydraulic part of the vehicle braking system. The pre-pressure here is not available immediately from the start throughout the operating period of the vehicle, but is only created on the basis of a trigger factor.

It is proposed here that the pre-pressure previously created, for example via an electric motor coupled to a pump device, is passed on to at least one of the wheel brakes of the vehicle braking system during the braking process occurring. The pre-pressure may be transferred to the wheel brake either in full or in part. Alternatively it is proposed that the pre-pressure may be supplemented by at least one additional pressure depending on the intensity of the braking process. The achieved sum of the pressures of the pre-pressure and additional pressure is transferred at least partially, to the respective necessary extent, to the at least one wheel brake. The number of wheel brakes thus influenced and/or generally present may for example depend on the respective vehicle type. Possible vehicles here in particular are single-track vehicles such as motorcycles, or multi-track vehicles such as cars.

According to the present disclosure, the pre-pressure created may be at least partially reduced before being passed on to the wheel brake(s). The reduction in the pre-pressure previously created is in no way a fundamental measure. Rather, this depends on certain criteria in order to be able to adapt the existing pre-pressure to the actual conditions to be expected. The pre-pressure may be at least partially reduced insofar as the braking pressure necessary for the braking process occurring lies below the pre-pressure previously created.

In other words, the present disclosure assumes that the creation of the pre-pressure, triggered by the trigger factor, is first carried out without taking into account the possible level of pressure required. That is, irrespective of the actually impending braking scenario, the pre-pressure may first be built up to a predefined level. Then, in accordance with the present disclosure, knowledge of/familiarity with the expected level of the possibly necessary brake pressure is used to adapt the existing pre-pressure. This adaption/reduction occurs if the level of the pre-pressure created lies above the level of pressure clearly necessary.

The resulting advantage lies in that the vehicle equipped with such a braking system, in addition to having a significantly shorter reaction time for a manual or autonomously initiated braking process, shows no tendency to unadapted over-braking despite the pre-pressure created. Therefore, due to the braking system operated with the measures according to the present disclosure, the pre-pressure is always passed on to at least one of the wheel brakes at the adapted level. In this way it is no longer possible for the full amount of pre-pressure to be passed on when a lower braking pressure would be required, and the vehicle or, more precisely, the correspondingly braked wheel would otherwise having too large a braking force applied.

A general improvement in performance of the electromechanical vehicle braking system operated in this way is thus available. The pre-pressure, created on the basis of one or more trigger factors, generally leads to a significant reduction in the reaction time of such a system. This is because a sufficient braking pressure is present even before a potential braking process. On actual occurrence of the expected braking process, this brake pressure may be used, either fully or only to the necessary extent, for direct application to the wheel brake. Furthermore, the pre-pressure may now be adapted to the actual requirements, in order to counter any over-braking. Because there is still the possibility of a sudden discharge of the pre-tensioned or pre-stressed system, a significantly faster fluid flow to the at least one wheel brake is achieved.

In accordance with the present disclosure, a method of operation of a brake system as disclosed herein should be regarded as a type of protective function which may run in parallel or in combination with existing control functions. In this way, for example, existing vehicles can be modified directly insofar as they are fitted with the correspondingly responsive hardware. Evidently vehicles can also be modified which first need to be fitted with corresponding hardware for performance of the method described here. Finally, vehicles can be modified which already have the facility for creating a pre-pressure.

The actual trigger factor or factors for creating the pre-pressure are found wherever there may be indicators of a possibly impending braking process. A trigger factor here in principle means all indicators which allow a prognosis in this direction. Since the performance improvement achievable by the present disclosure affects several areas, there is a correspondingly wide range of possible trigger factors for such an operation of an electromechanical vehicle braking system.

For example, a first of these trigger factors may include using the manner of activation of the respective control element for regulating the engine power as an indicator of a possibly impending braking process. Although the control element may be, for example, a gas valve or other type of auxiliary device, the measure described here will be explained in more detail below with reference to a foot pedal, more precisely a gas pedal/accelerator pedal.

The type of gas reduction achieved when the person controlling the vehicle lifts his foot from the gas pedal/accelerator pedal may be used as a basis for concluding a possibly directly impending braking process. For example, this may be a sudden rapid release of the gas pedal. This occurs whenever the right foot, which typically operates the accelerator pedal, is removed from the accelerator pedal and placed on the brake pedal in order to brake the vehicle. The more rapidly the driver releases the accelerator pedal, the more likely a braking even is imminent.

In practice, the first trigger factor may be defined on the basis of an available rate of change of the accelerator pedal input signal or else by an internal calculation of the quick release of the accelerator pedal. For example a function, in particular with at least one learning part, may be used. Here, for example the rate of change, more precisely the respective release of the gas pedal, may be observed over a longer period to allow a conclusion of an actually impending braking process with a greater certainty.

Evidently the position of the gas pedal and/or the rate of change may be rounded up and/or down, in order in this way to provide an additional measure for input filtration.

A signal from a detection device may also be used as a second trigger factor for creating the pre-pressure. This may, for example, be a detection device for object detection, such as those present in a collision warning device of the vehicle. Normally such devices are optical systems which contain for example an optical sensor, such as a camera and/or radar, to monitor the environment. These include all further sensor types which serve to detect obstacles.

Insofar as a relevant object is detected by the detection device, the signal already provided without the intervention of the driver may be used for creating the pre-pressure. In this way, well in advance of a necessary braking maneuver, the braking system may be set to standby for collision mitigation or emergency braking, in order to provide an adequate braking pressure directly. Due to the prediction relating to such a possible braking maneuver, there is regularly a sufficiently long period to create the necessary pre-pressure. In particular, in combination with a collision warning device on the vehicle, an efficient braking system is thus provided, the safety of which can be significantly increased further by the method according to the present disclosure.

The pre-pressure may also be created in two stages. This means that the pre-pressure may for example first reach an initial level and then for example rise to a second, definitive level. Such a two-stage pressure build-up is regarded as advantageous in particular in connection with the first and/or second trigger factors.

Thus, on creation of an initial level of pre-pressure on the basis of the first trigger factor and/or the second trigger factor, the initial pre-pressure may be passed on directly to the at least one wheel brake even during its creation. As a result, for example, the brake pads or shoes may be moved as close as possible to their corresponding brake components. The brake components may for example be a brake disc or a brake drum. In this way, it is possible to compensate virtually for any increased viscosity of braking fluid, as may occur at low ambient temperatures.

According to one aspect of the present disclosure, two methods may be used to determine the possible necessity for reducing the pre-pressure already created. The pre-pressure previously created may be reduced at least partially, for example, because of a manual deceleration request. Alternatively or additionally, the reduction may be carried out on the basis of an autonomous deceleration request.

A manual deceleration request, as used in the present disclosure, is one which originates from a person in the vehicle, in particular a person steering the vehicle. In contrast, an autonomous deceleration request is one which results from a system decision. The system triggering the autonomous deceleration request may be, for example, a safety system which functions, for example, as a stabilizing or collision warning device or an adaptive speed control of the vehicle.

The present disclosure therefore provides, in one exemplary embodiment, that a travel gradient of a brake pedal of the vehicle may be detected to establish any necessity for an at least partial reduction in pre-pressure.

Alternatively or additionally, a TMC pressure gradient may be detected to allow a conclusion on the possible necessity for an at least partial reduction of the pre-pressure already created. TMC here means Tandem Master Cylinder.

In both cases (travel gradient of the brake pedal and/or TMC pressure gradient), the respective detections may be evaluated in relation to at least one respective, associated threshold value. The respective threshold value may be established individually and therefore be adjustable. In principle, the evaluation in relation to the respective threshold value serves to check the necessity for a possible reduction in pre-pressure.

Insofar as the measured travel of the brake pedal and/or the TMC pressure gradient is smaller than the respective, associated threshold value, for example a threshold value which can be calibrated, there is a clear decision basis. On this basis, the brake system may begin to reduce at least part of its pre-pressure previously created, in order to fulfil the manual deceleration request in accordance with its requirements.

In particular, in accordance with one exemplary embodiment, the reduction in pre-pressure is dependent on the extent of the manual and/or autonomous deceleration request. In this way it is possible to adapt the pre-pressure created as a precautionary measure to the actual conditions very precisely.

Expressed as a function, for a manual deceleration request this can take the following form:

| | |
|---|---|
| IF | trvlgradnt < k_trvl_thrsh |
| | OR |
| | prssgradnt < k_prss_thrsh |
| THEN | reduction in pressure rise of pre-tension |
| ELSE | retention of pre-tension or generation of an additional pressure to fulfil the manual deceleration request. |

The associated abbreviations are defined as follows:

trvlgradnt = change in pedal travel within a specific time, which may be single or multiple time loops
prssgradnt = change in activation pressure of the brake pedal within a specific time, which may be single or multiple time loops
k_trvl_thrsh = threshold value of brake pedal travel below which the pre-pressure must be reduced
k_prss_thrsh = threshold value of TMC pressure below which the brake pre-pressure must be reduced In relation to an autonomous deceleration request, the present disclosure provides that the request itself be used to establish any necessity for at least partial reduction in pre-pressure. As already explained in connection with a manual deceleration request, the autonomous deceleration request may be evaluated in relation to at least one associated threshold value. The respective threshold value may be established individually, and therefore be adjustable. In principle the evaluation in relation to the respective threshold value serves to check the necessity for a possible reduction in pre-pressure.

Insofar as, on an autonomous deceleration request, the requested pressure is less than the associated threshold value, an adapted reduction in pre-pressure takes place by lowering the pressure level.

Expressed as a function, for an autonomous deceleration request, this could take the following form:

| | |
|---|---|
| IF | ext_decel_rq < k_ext_decel_thrsh |
| THEN | reduction in pressure increase in pre-tension |
| ELSE | retention of pre-tension or generation of additional pressure to fulfil the autonomous deceleration request. |

The associated abbreviations are defined as follows:

ext_decel_rq = definitive deceleration request to the braking system as a result of a decision between the various deceleration requests (to the braking system) of external origin
k_ext_decel_thrsh = threshold value of deceleration request below which the pre-pressure must be reduced To allow the at least partial reduction of the pre-pressure previously created, the present disclosure provides a device connected in a fluid-conductive manner to the vehicle braking system and controlled to reduce the pressure as required. The pressure reduction may take place, for example, by displacement of a pressure medium of by a linear drive device, which is connected fluid-conductively to the vehicle braking system. The linear drive device may be provided to pressurize the brake fluid by displacement of the pressure medium. The linear drive device may be, for example, a piston, which works against the volume of the brake fluid. In this way the pressure exerted on the brake fluid may be reduced by retracting the piston.

The linear drive device may have, for example, a circulating ball spindle in order to translate its rotation about its own longitudinal axis into a relative movement of the piston along the longitudinal axis. The piston may be advanced or retracted depending on the direction of rotation of the circulating ball spindle, whereby the pressure of the brake fluid may be increased or reduced to the same extent.

Alternatively or additionally, the pre-pressure created may be reduced at least partially in that, for example, at least part of the brake fluid pressurized with the pre-pressure is discharged. For this, a suitable storage vessel such as a brake fluid reservoir may be provided, into which part of the brake fluid may be returned when required. To achieve this, the vehicle brake system may have a suitable valve device. This may be used, for example, by at least partially and/or temporarily opening the valve device, for discharging the brake fluid from the part of the vehicle brake system loaded with the pre-pressure.

In principle, the possibility for reducing the created pre-pressure depends on the structure of the respective vehicle braking system. In particular, with regard to the configuration and arrangement of a hydraulic valve and/or the circuit structure of the brake system in general, it is left to the person skilled in the art to decide which existing or additional components may be used to achieve the necessary pressure reduction in the desired fashion.

In accordance with one exemplary embodiment, the valve device may be at least one proportional valve or the valve device may comprise such a valve. This allows a very precise metering in relation to the necessary quantity of brake fluid to be returned to achieve the desired pressure reduction.

According to one aspect of the present disclosure, the pre-pressure previously created may be maintained only within a predefined time period. Then the pre-pressure may be reduced at least partially or fully after expiry of this time period. The time period would always be decisive if the expected braking process does not occur. In this way the pre-pressure would not be maintained for an unnecessarily long time despite there being no reason for this. As a result, for example, the load acting on individual components of the vehicle braking system because of the pre-pressure may be reduced as a whole.

Turning now to the drawings, a flowchart illustrating a method of operating the brake system 100 based on driver deceleration is shown in FIG. 1. As shown in FIG. 1, a determination of the presence of a driver deceleration trigger, such as calculation of a quick release of the acceleration pedal, is made at step 105. At step 110, an initial portion of the pre-charge pressure is passed to the wheel brake(s) as it builds. The pre-charge pressure can be passed directly to the at least one wheel brake during the buildup of the pre-charge pressure, moving the brake pads or brake calipers close to the brake component to which they correspond. After the initial portion of the pre-charge pressure is passed to the wheel brake(s), the valve(s) to the wheel brake(s) are closed. The pre-charge pressure continues to build in the brake system (step 115) until the secondary pre-charge pressure is built up. After buildup of the secondary pressure, a determination is made whether to reduce the secondary pre-pressure at step 120. At step 125 the secondary pre-pressure is reduced based on the type of event—in this case manual deceleration. Although not shown here, it is contemplated that a determination could also be made to increase the secondary pre-pressure. At step 130, the reduced secondary pre-pressure is maintained in the brake system. A driver deceleration request (step 135) will cause the valves to open and the reduced secondary pre-charge pressure to be directed to the wheel brakes (step 140). The reduced secondary pre-charge pressure is maintained after buildup (step 130), until a driver deceleration request is received, or a time period for maintaining the ultimate or secondary pre-charge pressure expires (step 145). If no request is received and the time period for maintaining the reduced secondary pre-charge pressure expires, then the reduced secondary pre-charge pressure is released in the brake system (step 147) and the method begins again.

Alternatively, if at step 120 the determination is made not to reduce the secondary pre-pressure, the secondary pre-pressure is maintained (step 150). A driver deceleration request (step 155) will cause the valves to open and the secondary pre-charge pressure to be directed to the wheel brakes (step 160). The secondary pre-charge pressure is maintained after buildup (step 150), until a driver deceleration request is received, or a time period for maintaining the ultimate or secondary pre-charge pressure expires (step 165). If no request is received and the time period for maintaining the reduced secondary pre-charge pressure expires, then the reduced secondary pre-charge pressure is released in the brake system (step 170) and the method begins again.

FIG. 2 provides a flowchart illustrating a method of operating the brake system 200 based on automatically requested deceleration (collision mitigation/avoidance). As shown in FIG. 2, a determination of the presence of an automatic deceleration trigger, such as detection of an object by a detection system of a collision warning system, is made at step 205. At step 210, an initial portion of the pre-charge pressure is passed to the wheel brake(s) as it builds. The pre-charge pressure can be passed directly to the at least one wheel brake during the buildup of the pre-charge pressure, moving the brake pads or brake calipers close to the brake component to which they correspond. After the initial portion of the pre-charge pressure is passed to the wheel brake(s), the valve(s) to the wheel brake(s) are closed. The pre-charge pressure continues to build in the brake system (step 215) until the secondary pre-charge pressure is built up. After buildup of the secondary pressure, a determination is made whether to reduce the secondary pre-pressure at step 220. At step 225 the secondary pre-pressure is reduced based on the type of event—in this case an autonomous deceleration request. Although not shown here, it is contemplated that a determination could also be made to increase the secondary pre-pressure. At step 230, the reduced secondary pre-pressure is maintained in the brake system. A driver deceleration request (step 235) will cause the valves to open and the reduced secondary pre-charge pressure to be directed to the wheel brakes (step 240). The reduced secondary pre-charge pressure is maintained after buildup (step 230), until a driver deceleration request is received, or a time period for maintaining the ultimate or secondary pre-charge pressure expires (step 245). If no request is received and the time period for maintaining the reduced secondary pre-charge pressure expires, then the reduced secondary pre-charge pressure is released in the brake system (step 247) and the method begins again.

Alternatively, if at step 220 the determination is made not to reduce the secondary pre-pressure, the secondary pre-pressure is maintained (step 250). A driver deceleration request (step 255) will cause the valves to open and the secondary pre-charge pressure to be directed to the wheel brakes (step 260). The secondary pre-charge pressure is maintained after buildup (step 250), until a driver deceleration request is received, or a time period for maintaining the ultimate or secondary pre-charge pressure expires (step 265). If no request is received and the time period for maintaining the reduced secondary pre-charge pressure expires, then the reduced secondary pre-charge pressure is released in the brake system (step 270) and the method begins again.

The method described above can be performed in one or more devices of the vehicle. For example, the method can be performed by a control device of the brake system such as a central control unit (not shown) or controller. The control device can be implemented within any element of the hydraulic brake system such as a control unit. Alternatively, the control device can be a separate device from any of the above-described hydraulic brake system elements. The control device can include a storage element such as a disk drive, flash drive, memory circuit, or other memory device. The storage element can store software which can be used in operation of the control device. Software can include computer programs, firmware, or some other form of machine-readable instructions, including an operating system, utilities, drivers, network interfaces, applications, and the like. The control device can further include a processing element such as a microprocessor or other circuitry to retrieve and execute software from the storage element. The control device can also comprise other components such as a power management unit, a control interface unit, etc.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A method for operating an electromechanical vehicle brake system, comprising:
   determining that an activation condition has been met;
   building an initial portion of a pre-pressure in the brake system;
   applying the initial portion of the pre-pressure to at least one wheel brake;
   building a secondary portion of the pre-pressure in the brake system; and
   adjusting the secondary portion of the pre-pressure to an expected braking pressure.

2. The method as claimed in claim 1, wherein adjusting the secondary portion of the pre-pressure is based at least in part on whether a manual or an autonomous deceleration request is expected.

3. The method as claimed in claim 2, further comprising, when a manual deceleration request is expected:
   detecting a travel gradient of a brake pedal; and
   evaluating the detected travel gradient relative to at least one associated threshold value to establish a basis for a pre-pressure adjustment.

4. The method as claimed in claim 3, further comprising reducing the secondary portion of the pre-pressure based on the evaluation.

5. The method as claimed in claim 4, wherein reducing the secondary portion of the pre-pressure comprises reducing the secondary portion of the pre-pressure by displacement of a pressure medium with a linear drive device which is connected fluid-conductively to the vehicle braking system or returning a portion of a brake fluid of the vehicle braking system, pressurized with the secondary portion of the pre-pressure, to a storage vessel.

6. The method as claimed in claim 2, further comprising, when a manual deceleration request is expected:
   detecting a TMC pressure gradient; and
   evaluating the detected TMC pressure gradient relative to at least one associated threshold value to establish a basis for a pre-pressure adjustment.

7. The method as claimed in claim 6, further comprising reducing the secondary portion of the pre-pressure based on the evaluation.

8. The method as claimed in claim 7, wherein reducing the secondary portion of the pre-pressure comprises reducing the secondary portion of the pre-pressure by displacement of a pressure medium with a linear drive device which is connected fluid-conductively to the vehicle braking system or returning a portion of a brake fluid of the vehicle braking system, pressurized with the secondary portion of the pre-pressure, to a storage vessel.

9. The method as claimed in claim 2, further comprising, when an autonomous deceleration request is expected:
   detecting the autonomous deceleration request; and
   evaluating the autonomous deceleration request relative to at least one associated threshold value to establish a basis for a pre-pressure adjustment.

10. The method as claimed in claim 9, further comprising reducing the secondary portion of the pre-pressure based on the evaluation.

11. The method as claimed in claim 10, wherein reducing the secondary portion of the pre-pressure comprises reducing the secondary portion of the pre-pressure by displacement of a pressure medium with a linear drive device which is connected fluid-conductively to the vehicle braking system or returning a portion of a brake fluid of the vehicle braking system, pressurized with the secondary portion of the pre-pressure, to a storage vessel.

12. The method as claimed in claim 1, further comprising releasing the secondary portion of the pre-pressure without application to wheel brakes upon expiry of a predetermined time period when the expected brake process does not occur.

13. The method of claim 1, wherein building the initial portion of the pre-pressure in the brake system comprises activating a device configured to generate the initial portion of the pre-pressure in the brake system independently of operation of a master cylinder of the brake system.

14. The method of claim 1, wherein building the initial portion of the pre-pressure in the brake system comprises building the initial portion of the pre-pressure prior to receiving a deceleration request.

15. An electromechanical vehicle brake system, comprising:
   a controller configured to:
      request buildup of an initial portion of a pre-pressure in the brake system when a trigger has been met;
      direct the initial portion of the pre-pressure to at least one wheel brake;
      request buildup of a secondary portion of the pre-pressure in the brake system; and
      adjust the secondary portion of the pre-pressure based on an expected braking pressure.

16. The electromechanical vehicle brake system of claim 15, wherein:
   the vehicle further comprises a collision warning device including at least one sensor, and
   wherein the trigger comprises a signal from the at least one sensor of the collision warning device.

17. The electromechanical vehicle brake system of claim 16, wherein the at least one sensor of the collision warning device comprises at least one of an optical sensor and a radar sensor.

18. The electromechanical vehicle brake system of claim 15, wherein the trigger comprises a rate of release of an accelerator exceeding a predetermined rate of release.

* * * * *